US006460590B1

(12) United States Patent
Morel

(10) Patent No.: US 6,460,590 B1
(45) Date of Patent: Oct. 8, 2002

(54) TIRE WITH A CARCASS REINFORCEMENT HAVING TWO RIGIDITIES

(75) Inventor: Noël Morel, Enval (FR)

(73) Assignee: Compagnie Generale des Etablissements Michelin-Michelin & Cie, Clermont-Ferrand Cedex (FR)

(*) Notice: Subject to any disclaimer, the term of this patent is extended or adjusted under 35 U.S.C. 154(b) by 50 days.

(21) Appl. No.: 09/704,777

(22) Filed: Nov. 2, 2000

Related U.S. Application Data

(63) Continuation of application No. PCT/EP99/02816, filed on Apr. 27, 1999.

(30) Foreign Application Priority Data

May 6, 1998 (FR) .............................. 98 05870

(51) Int. Cl.[7] .............................. B60C 9/00; B60C 9/02; B60C 9/04; B60C 9/08
(52) U.S. Cl. ..................... 152/556; 152/548; 152/557
(58) Field of Search ................ 152/458, 556, 152/548, 558, 559, 560, 557

(56) References Cited

U.S. PATENT DOCUMENTS

| 2,894,555 | A | | 7/1959 | Bourdon |
| 3,844,327 | A | * | 10/1974 | Marzocchi ............. 152/556 X |
| 4,185,675 | A | | 1/1980 | Greiner et al. |
| 4,733,706 | A | * | 3/1988 | Schmit ................. 152/556 X |

FOREIGN PATENT DOCUMENTS

| DE | 1921750 | | 11/1970 | |
| FR | 1425801 | | 12/1965 | |
| JP | 03016804 A | * | 1/1991 | ................. 152/548 |
| JP | 08189203 | * | 8/1991 | ................. 152/548 |

* cited by examiner

Primary Examiner—Adrienne C. Johnstone
(74) Attorney, Agent, or Firm—Baker Botts L.L.P.

(57) ABSTRACT

A tire having a radial carcass reinforcement covered radially on the outside by a crown reinforcement consisting of two working plies of reinforcement elements crossed over and making angles of between 10° and 45° with respect to the circumferential direction, the carcass reinforcement in its portion underneath the crown reinforcement being formed of cut reinforcement elements.

6 Claims, 2 Drawing Sheets

TIRE WITH A CARCASS REINFORCEMENT HAVING TWO RIGIDITIES

This is a continuation of PCT/EP 99/02816, filed Apr. 27, 1999.

BACKGROUND OF INVENTION

The invention concerns a tire with radial carcass reinforcement, covered radially by a crown reinforcement consisting of at least two working plies formed of reinforcement elements mutually parallel within each ply and crossed over from one ply to the next so as to make angles of small absolute value ranging from 10° to 45° with respect to the circumferential direction.

In a tire corresponding to the present state of the art, the carcass reinforcement is formed of at least one ply of reinforcement elements which are radial or are termed radial, in other words elements which make an angle of 90°±10° with respect to the circumferential direction. The said reinforcement elements are either textile cables, which is generally the case in tires for passenger vehicles, aircraft or agricultural machinery, which have one or more carcass plies, or metallic cables in the case of tires for heavy road vehicles or civil engineering machinery, which generally have just one carcass ply. The said elements extend continuously from one bead-wire to the other and are anchored in each tire bead by being turned up around the bead wire.

During the manufacture of the tire, the ply or plies of the carcass reinforcement, whether of textile or metal, such as steel, are first positioned on a cylindrical drum and then shaped to form a toroidal tire blank before being radially capped with a crown reinforcement. During molding in the mold of the vulcanizing press, the toroidal tire blank so obtained undergoes additional shaping.

In the case of a tire with metallic carcass reinforcement, whose reinforcement elements are nonextensible, i.e. showing very little elongation under a tensile force equal to 10% of the breaking force, the various transformations undergone by the unvulcanized carcass and tire blanks give rise to a phenomenon known as flowing of the internal layers of rubber mix, particularly in the area of the shoulders of the tire. This flowing phenomenon varies circumferentially in its extent and is or can be an important factor in reducing the endurance of the carcass reinforcement of the tire. In the case of tires with radial carcass reinforcement consisting of reinforcement elements made of a thermo-contracting textile or plastic material, the vulcanization of the tire leads to the same phenomenon of flowing of the internal layers.

An obvious solution for resolving such problems would be to increase the thickness of the inside layers considerably, but equally obviously, such a solution would not be optimum either from the standpoint of the tire's properties (since the extra thickness would result in more heating at the shoulders, increased rolling resistance, etc.) or from that of manufacturing cost.

Patent FR 1 111 805 describes a carcass reinforcement in two distinct portions, which overlap in the area of the tire's equatorial plane. This way of arranging the ply or plies of the carcass reinforcement has technical advantages, both as regards ease of manufacture and as regards the flexibility of the tire.

Patent FR 1 111 806 describes the same arrangement of two portions of the radial carcass reinforcement to make up for the shortcomings of the triangulation ply located radially above the working crown plies.

Patent FR 1 425 801 recognizes that this arrangement of carcass ply layers which are not continuous but superimposed in the equatorial portion of the tire not only affords the desirable reinforcement under the tread but also provides a better balance of forces during the shaping of the unvulcanized tire blank because the overlap in the equatorial area of the tire allows certain relative movements of the resistance elements before vulcanization.

Such movements are not sufficient to avoid the phenomenon of flowing of the internal layers through the carcass reinforcement cables because the contact width between the two overlapping portions, an overlap which is necessary to ensure anchoring by shearing of the two portions, is too large since it is generally almost equal to the width of the crown reinforcement. Moreover, the radial superimposition of several carcass layers underneath the crown reinforcement influences the meridian flexibility of the carcass reinforcement - crown reinforcement assembly, and in particular the position of the neutral bending axis, which is not always desirable.

SUMMARY OF THE INVENTION

The invention proposes a different solution, which consists in subdividing the carcass reinforcement that is continuous from one bead-wire to the other into three parts, and providing the part of the carcass reinforcement under the crown reinforcement with elasticity greater than the elasticity of the parts that reinforce the sidewalls of the tire, this greater elasticity being achieved by the use of cut reinforcement elements.

According to the invention, a tire comprising a carcass reinforcement consisting of at least one ply of reinforcement elements anchored in each tire bead to at least one bead-wire, the said carcass reinforcement being radially covered by a crown reinforcement consisting of at least two working plies formed of reinforcement elements crossed over from one ply to the next and making angles between 10° and 45° with respect to the circumferential direction, is characterized in that the part of the carcass reinforcement underneath the crown reinforcement, centered on the equatorial plane and having axial width between 0.4 and 1 times the width of the widest working crown ply is formed of cut reinforcement elements.

The preferred solution consists in that each reinforcement element of the part of the carcass reinforcement whose width is between 0.4 and 1 times the axial width of the widest working crown ply is cut at least once.

Advantageously, in the unvulcanized condition the said portion under the crown reinforcement will have a linear tensile rigidity per unit width between 0.1 and 0.7 times the linear tensile rigidity of each part of the same carcass reinforcement which reinforces the sidewall of the tire, such that the said ratio of linear rigidities becomes between 0.2 and 1 when the tire is vulcanized.

A rigidity before vulcanization of the portion under the crown lower than 0.1 times the rigidity of the sidewall portion would make it impossible to ensure geometrical stability of the uncured tire blank and, in the vulcanized condition, would not allow sufficient tension under the effect of the inflation pressure to ensure satisfactory triangulation of the crown reinforcement. A linear rigidity greater than 0.7 times the rigidity of a sidewall portion would not avoid flowing of the internal rubber layers.

The linear tensile rigidity results from the tensile force exerted on a strip of the carcass reinforcement, of unit width, required to obtain a relative elongation $\epsilon$ of 0.5%. It can be expressed by the formula $R = dF/d\epsilon$ where R is the linear rigidity, and $dF/d\epsilon$ is the derivative of the force per unit width with respect to the relative elongation ε. In the case of the linear rigidity in the unvulcanized condition, it is measured on a strip of the semi-finished product, namely the unvulcanized carcass reinforcement. In the case of the linear rigidity in the vulcanized condition, it is measured on a strip of unit width cut from the vulcanized tire.

Whatever the solution adopted to obtain such linear rigidity ratios, the tension of the reinforcement elements of the carcass reinforcement in the sidewalls of the tire will become almost constant all round the circumference of the tire. Besides the fact that this solves the problem of interior layer flowing on which the invention is based, the solution of cut reinforcement elements makes it possible for the carcass reinforcement in part to preserve its role as a triangulation reinforcement, since the cut elements offer some resistance to compression forces. This solution is the most reliable and industrially the least costly, and it also has a number of important advantages, such as giving better uniformity and in particular appreciably reducing the amplitude of the radial variation no matter which harmonic is considered, and therefore also increasing comfort, or such as reducing the deformations of the external surfaces of the sidewalls, deformations which are perceptible to the eye and which confer a faulty-looking external appearance upon the tire.

DESCRIPTION OF THE DRAWINGS

The characteristics of the invention will be better understood from the description given below, which refers to the drawings that illustrate exemplary embodiments in a non-limiting way, and in which.

DESCRIPTION OF PREFERRED EMBODIMENTS

Figure 1:
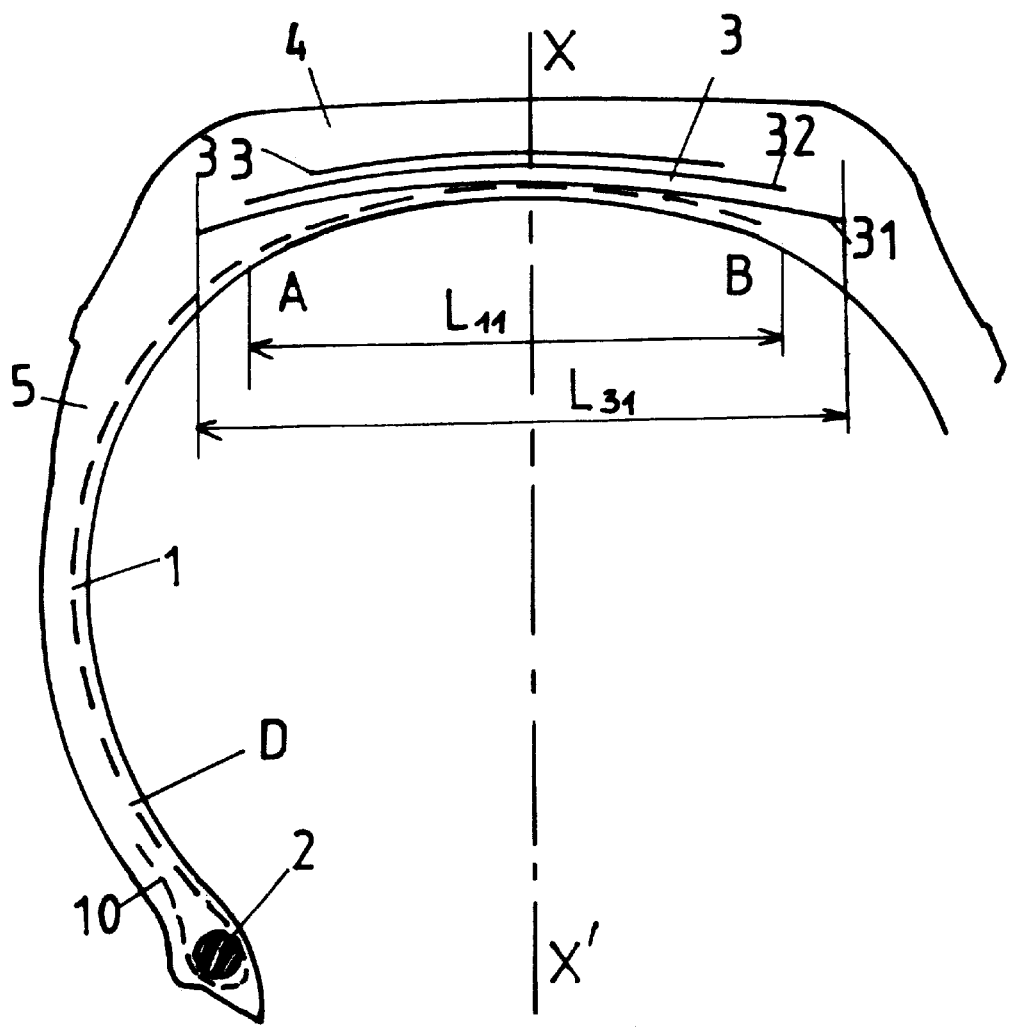
FIG. 1 shows a schematic representation, seen in meridian section, of a first preferred variant of a tire according to the invention.

The tire shown in FIG. 1 comprises a carcass reinforcement composed of a single carcass ply 1 formed of reinforcement elements which are radial polyester cables. The said ply 1 is anchored in each tire bead to a bead wire 2, with a portion 10 folded back over itself. In its central portion and on either side of the equatorial plane XX', the said carcass ply 1 is covered radially by a crown reinforcement 3 consisting, in the case described, on the one hand of two working plies 31 and 32 formed of non-extensible metallic steel cables mutually parallel within each ply and crossed over from one ply 31 to the next 32 so as to make, with respect to the circumferential direction, an angle α of 22°, and on the other hand by a so-termed protection ply 33 formed of circumferential aliphatic polyamide cables which make an angle β within the range +5° to −5° with respect to the circumferential direction. The tire is completed by a tread 4 connected to the beads by two sidewalls 5, and by the various known rubber mixes customarily used, such as the inside layer, the various fillers above and around the anchoring bead-wires, the layer protecting the beads, etc.

The working ply 31 closest to the carcass ply 1 is axially the widest, and its axial width $L_{31}$ is equal to 140 mm. The portion AB of the carcass ply 1 positioned under the crown reinforcement on either side of the equatorial plane XX', has an axial width $L_{11}$ equal to 130 mm, or 0.93 times the width $L_{31}$. The cables 11 of the portion AB of the carcass ply, in the unvulcanized state (FIG. 2), comprise one cut 12 per cable with the cuts in circumferentially adjacent cables 11 staggered so as to give a width 1 between cuts 12 in adjacent cables equal in the case described to 0.4 times the width $L_{31}$ or 56 mm, the cuts being considered as formed at the center of the space 13 between two sections 110 of cables. The width $1_1$ of the overlap between cables is clearly a function of the width $1_2$ of the space 13 between the ends of two sections 110 of cables 11, and in the case described is equal to 55 mm which, for a strip AB of unit width, gives a linear rigidity in the unvulcanized condition equal to 0.5 times the linear rigidity, in the unvulcanized condition, of a strip AD of the same length in the carcass ply reinforcing the sidewall and formed of the same cables 11, but uncut, while the linear rigidity of the said strip AB in the vulcanized condition is equal to 0.6 times the linear rigidity of the sidewall strip AD in the same condition.

Figure 2:
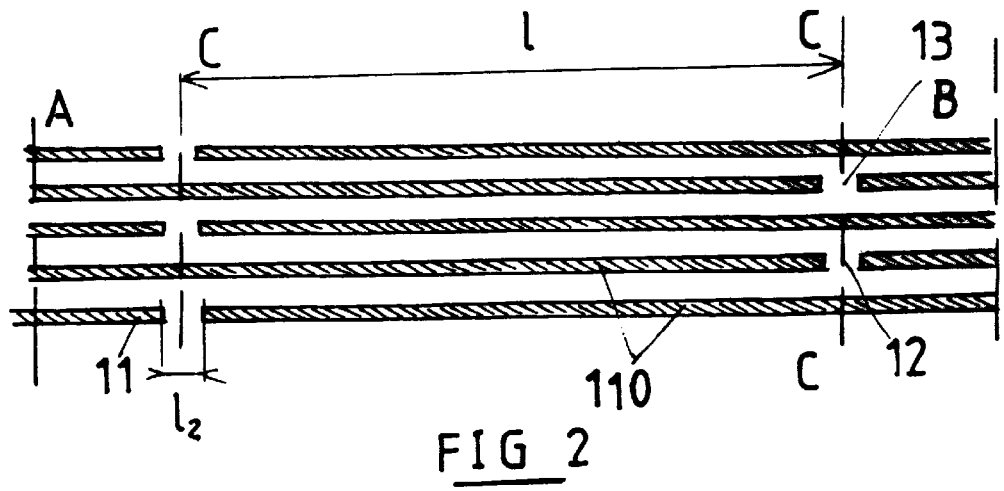
FIG. 2 shows a plan view of the carcass reinforcement of the tire of FIG. 1.

Though, as shown in FIG. 2, the lines of cuts CC are axially separated by an amount equal to 0.4 times the width $L_{31}$, it is no less certain that the distance between the said lines CC can be between 0.28 and 0.7 times the width $L_{31}$ without departing from the scope of the invention.

Figure 3:
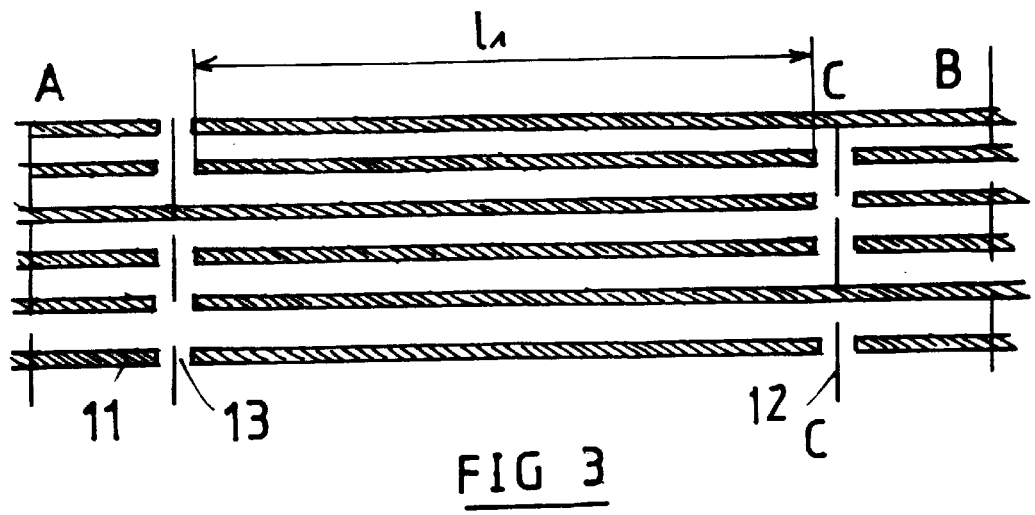
FIG. 3 shows a schematic representation, in plan view, of a second carcass reinforcement variant.

The portion AB of the carcass ply 1 shown in FIG. 3 differs from the portion in FIG. 2 in the arrangement of the cuts 12. In effect, one cable 11 out of every two has two cuts 12 a distance 1 apart equal to 0.4 times the width $L_{31}$, one of the cuts 12 being in the circumferential extension of the cut 12 of one of the two circumferentially adjacent cables 11, while the other cut 12 is in the circumferential extension of the cut 12 of the other circumferentially adjacent cable 11. The lines of cuts CC so formed remain separated by the distance 1. This arrangement makes it easier to control the process of cutting the reinforcement cables, while ensuring that the number of cuts is sufficient.

Figure 4:
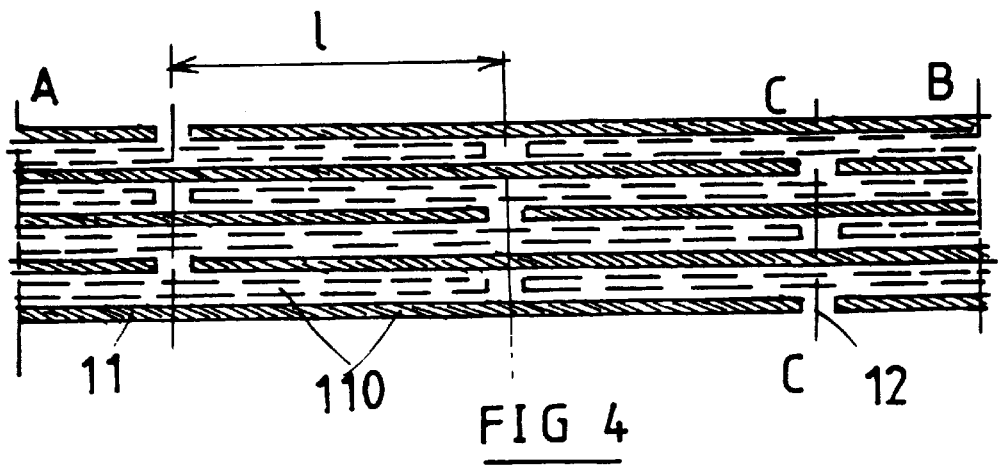
FIG. 4 shows a plan view of a carcass reinforcement formed of two plies according to the invention.

FIG. 4 shows an arrangement of cuts 12 in the cables 11 forming two carcass reinforcement plies 1 for a radial tire, the lines of cuts being separated by a distance equal to 0.2 times the width $L_{31}$, as shown clearly in the said FIG. 4. As shown, the overlap lengths between the cables of one ply are preferably equal to the overlap lengths between the cables of the other ply.

The said carcass reinforcement with cut cables in the portion AB is, as usual, prepared by assembling the cables and coating them with a rubber mix, and then cutting them to obtain the desired meridian length The ply prepared and cut in this way is placed on a table where a device provided with several cutting blades can move vertically and come down onto and cut the cables, the said blades being previously adjusted in their longitudinal and transverse spacing such that the cuts are made in the positions desired.

I claim:

1. A tire having a carcass reinforcement including at least one ply of reinforcement elements anchored in each bead to at least one bead wire, the carcass reinforcement being radially covered by a crown reinforcement comprising at least two working plies formed of reinforcement elements crossed over from one ply to the next and making angles of between 10° and 45° with respect to the circumferential direction, wherein the portion AB of the carcass reinforcement positioned under the crown reinforcement, centered on the equatorial plane XX' and having axial width between 0.4 and 1 times the width of the widest working crown ply, is formed of cut reinforcement elements, and the portion AB of the carcass reinforcement has, in the unvulcanized condition, a linear tensile rigidity per unit width between 0.1 and 0.7 times the linear tensile rigidity of each portion AD of the same carcass reinforcement that reinforces the sidewall of the tire, such that the ratio between the linear rigidities becomes between 0.2 and 1 when the tire is vulcanized.

2. A tire according to claim 1, wherein each reinforcement element in the portion AB of the carcass reinforcement is cut at least once.

3. A tire having a carcass reinforcement including at least one ply of reinforcement elements anchored in each bead to at least one bead wire, the said carcass reinforcement being radially covered by a crown reinforcement comprising at least two working plies formed of reinforcement elements crossed over from one ply to the next and making angles of between 10° and 45° with respect to the circumferential direction, wherein the portion AB of the carcass reinforcement positioned under the crown reinforcement, centered on the equatorial plane XX' and having axial width between 0.4 and 1 times the width of the widest working crown ply, is formed of cut sections of reinforcement elements, and the cuts between sections are staggered between two circumferentially adjacent reinforcement elements to form lines of cuts CC axially separated by a distance between 0.28 and 0.7 times the width of the widest working crown ply.

4. A tire according to claim 3, wherein each reinforcement element in the portion AB of the carcass reinforcement is cut at least once.

5. A tire having a carcass reinforcement including at least one ply of reinforcement elements anchored in each bead to at least one bead wire, the said carcass reinforcement being radially covered by a crown reinforcement comprising at least two working plies formed of reinforcement elements crossed over from one ply to the next and making angles of between 10° and 45° with respect to the circumferential direction, wherein the portion AB of the carcass reinforcement positioned under the crown reinforcement, centered on the equatorial plane XX' and having axial width between 0.4 and 1 times the width of the widest working crown ply, is formed of cut reinforcement elements, and one reinforcement element out of every two circumferentially adjacent elements has two cuts, one of the cuts being in the circumferential extension of the cut of one of the two circumferentially adjacent elements, while the other cut is in the circumferential extension of the cut in the other circumferentially adjacent element, the lines of cuts CC so formed being axially separated by a distance between 0.28 and 0.7 times the width of the widest working crown ply.

6. A tire according to claim 5, wherein each reinforcement element in the portion AB of the carcass reinforcement is cut at least once.

* * * * *